US007669586B2

(12) United States Patent
Prior

(10) Patent No.: US 7,669,586 B2
(45) Date of Patent: Mar. 2, 2010

(54) VENTED GEAR DRIVE ASSEMBLY FOR A SUPERCHARGER

(75) Inventor: Gregory P. Prior, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 318 days.

(21) Appl. No.: 11/742,868

(22) Filed: May 1, 2007

(65) Prior Publication Data

US 2008/0271719 A1 Nov. 6, 2008

(51) Int. Cl.

| | |
|---|---|
| ***F02B 33/00*** | (2006.01) |
| ***F01C 1/00*** | (2006.01) |
| ***F04C 18/00*** | (2006.01) |
| ***F04C 2/00*** | (2006.01) |
| ***F16H 57/02*** | (2006.01) |
| ***F16H 57/04*** | (2006.01) |

(52) U.S. Cl. ................. 123/559.1; 123/559.3; 418/203; 418/201.1; 74/606 R

(58) Field of Classification Search ............. 123/559.1, 123/559.3; 418/201.1–201.3, 203, 197; 74/606 A, 74/606 R, 607; *F16H 57/04, 57/02*
See application file for complete search history.

(56) References Cited

U.S. PATENT DOCUMENTS

| | | | | | |
|---|---|---|---|---|---|
| 1,974,974 | A | * | 9/1934 | Puffer | 74/606 R |
| 2,014,932 | A | * | 9/1935 | Hallett | 418/203 |
| 2,477,002 | A | * | 7/1949 | Paget | 418/201.1 |
| 3,422,982 | A | * | 1/1969 | Myers et al. | 220/374 |
| 4,351,203 | A | * | 9/1982 | Fukunaga | 74/606 R |
| 4,712,442 | A | * | 12/1987 | Baika et al. | 74/606 R |
| 4,755,103 | A | * | 7/1988 | Streifinger | 184/6.11 |
| 4,987,795 | A | * | 1/1991 | Nguyen | 74/606 R |
| 5,871,339 | A | * | 2/1999 | Goto et al. | 417/313 |
| 2008/0286138 | A1 | * | 11/2008 | Achtelik et al. | 418/91 |

FOREIGN PATENT DOCUMENTS

| | | | | |
|---|---|---|---|---|
| JP | 62124357 | A | * | 6/1987 |
| SU | 945538 | B | * | 7/1982 |

OTHER PUBLICATIONS

A fully Certified English Translation SU 945538 B was published in Russia, on Jul. 23, 1982.*

* cited by examiner

*Primary Examiner*—Thai Ba Trieu

(57) ABSTRACT

A gear drive assembly for a supercharger is provided. The gear drive assembly has at least one gear member rotatable about an axis of rotation and includes a cover member operable to substantially enclose the at least one gear member. A tube member extends though the cover member and is generally aligned along the axis of rotation. The tube member is operable to vent the gear drive assembly. A supercharger assembly incorporating the gear drive assembly is also disclosed.

13 Claims, 4 Drawing Sheets

VENTED GEAR DRIVE ASSEMBLY FOR A SUPERCHARGER

TECHNICAL FIELD

The present invention relates to a vented gear drive assembly for a compressor or supercharger.

BACKGROUND OF THE INVENTION

It is known in the art to utilize positive displacement compressors, such as roots-type and screw-type compressors, having lobed rotors for supercharging internal combustion engines and for providing compressed air for other purposes. Such a compressor, when used as an automotive supercharger, may include a housing having a rotor cavity in which a pair of rotors, having interleaved lobes, rotates to transport volumes of intake air between an inlet passage of the housing and an outlet passage of the housing thereby increasing the pressure at the outlet passage.

Sustained high load operation of the supercharger increases the air temperature exiting the supercharger, with the highest temperatures typically reached at high engine speeds and supercharger loads. The air tends to heat lubricating oil within a gear drive assembly of the supercharger by forced convection/conduction.

SUMMARY OF THE INVENTION

A gear drive assembly for a supercharger assembly is provided. The gear drive assembly includes at least one gear member rotatable about an axis of rotation. A cover member is operable to substantially enclose the at least one gear member. A tube member extends through the cover member and is positioned substantially adjacent to the at least one gear member and is generally aligned along the axis of rotation. The cover member at least partially defines a volume within which a predetermined amount of lubricating oil is disposed. The tube member is positioned above the predetermined amount of lubricating oil when the at least one gear member is not rotating and is operable to vent the gear drive assembly. A supercharger assembly incorporating the gear drive assembly is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
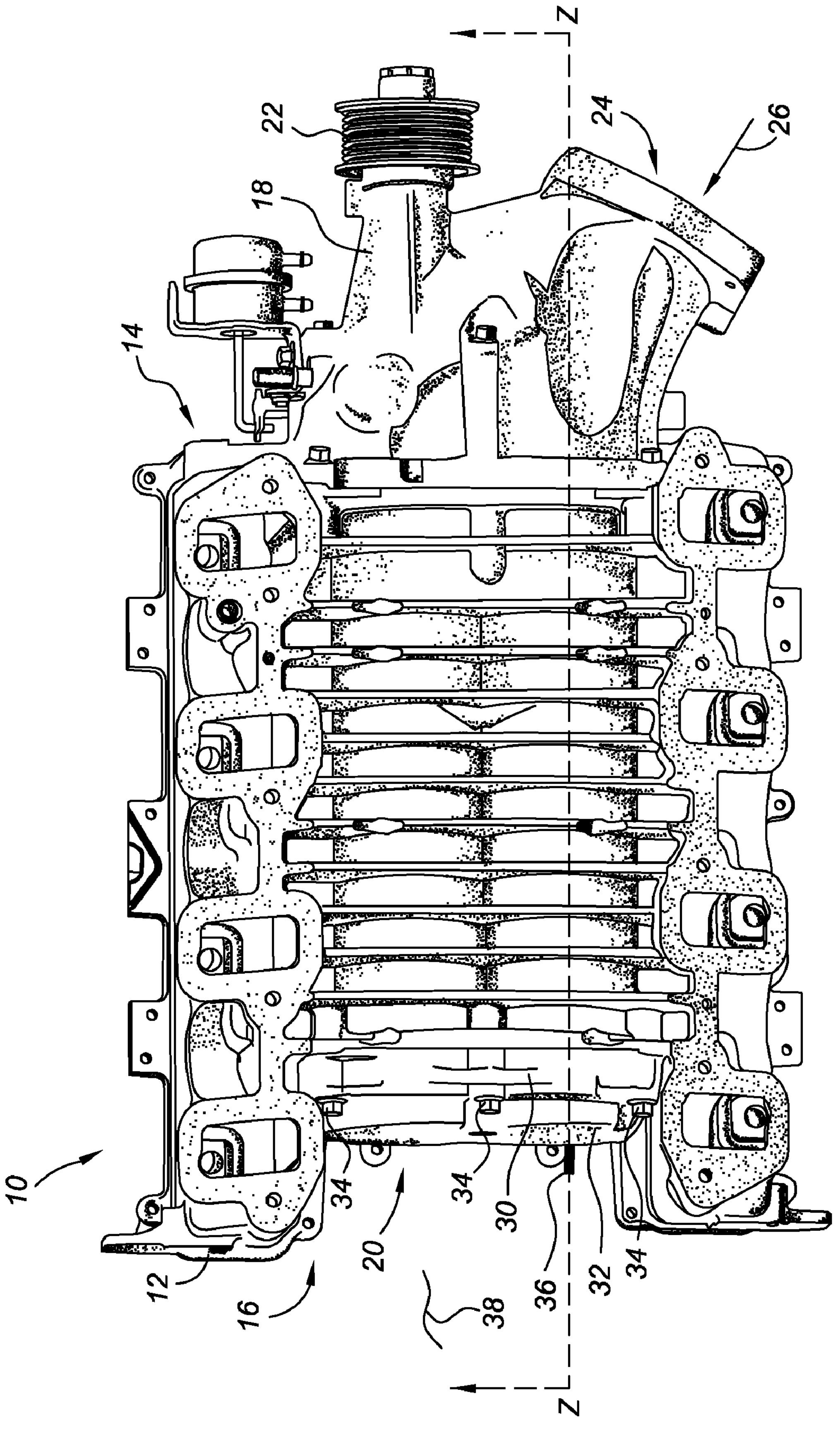
FIG. 1 is a bottom view of a supercharger assembly adapted for use with an internal combustion engine.

Referring to the drawings wherein like reference numbers correspond to like or similar components throughout the several figures, there is shown in FIG. 1 a compressor or supercharger assembly, generally indicated at 10. The supercharger assembly 10 is adapted for use with an internal combustion engine, not shown, and is operable to increase the volumetric efficiency thereof. The supercharger 10 may be a roots-type or screw-type supercharger. The supercharger assembly includes a housing 12. The housing 12 is preferably formed from cast metal such as, for example, aluminum, magnesium, etc. The housing 12 includes a first end 14 and an opposed second end 16. A supercharger drive assembly 18 is mounted with respect to the first end 14 of the housing 12, while a gear drive assembly 20 is mounted with respect to the second end 16 of the housing 12. The supercharger drive assembly 18 includes a shaft mounted pulley 22 configured to receive a belt, not shown, thereon to transmit driving force from the internal combustion engine to the supercharger assembly 10. Positioned substantially adjacent to the supercharger drive assembly 18 is an inlet duct 24 operable to convey intake air, indicated by arrow 26, into the housing 12 of the supercharger assembly 10.

Figure 2:
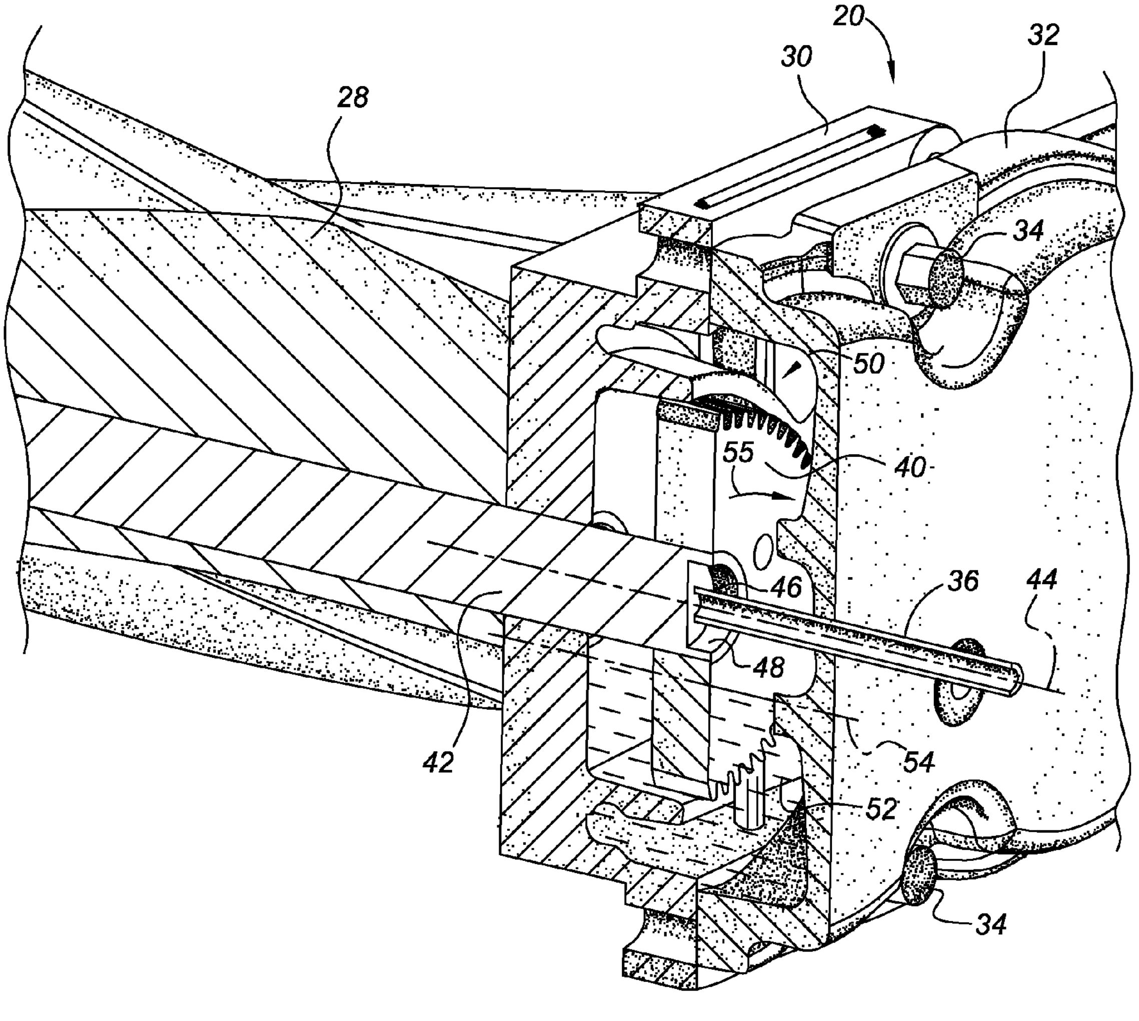
FIG. 2 is a cross sectional perspective view of a portion of the supercharger assembly taken along Line Z-Z of FIG. 1, illustrating a gear drive assembly consistent with the present invention.

The gear drive assembly 20 is operable to maintain rotational timing between a pair of interleaved, counter rotating rotor assemblies 28, one of which is shown in FIG. 2. The gear drive assembly includes a bearing support member 30 mounted to said housing 12, while a cover member 32 is mounted to the bearing support member 30. The cover member 32 and bearing support member 30 are removably mounted with respect to the housing 12 by a plurality of fasteners 34. The cover member 32 and bearing support member 30 are preferably formed from metal such as, for example, aluminum, magnesium, steel, etc. A tube member 36 extends through the cover member 32 and is operable to vent the gear drive assembly 20 to the atmosphere 38. The tube member 36 is preferably held within the cover member 32 by interference fit or adhesive bonding; however, other methods may be employed to retain the tube member 36 with respect to the cover member 32 while remaining within the scope of that which is claimed. The construction and operation of the gear drive assembly 20 will be discussed in greater detail hereinbelow with reference to FIGS. 2 through 4.

Referring now to FIG. 2 and with continued reference to FIG. 1, there is shown a sectional view of the gear drive assembly 20 of FIG. 1. The gear drive assembly 20 includes a gear member 40 mounted to a shaft member 42 for unitary rotation therewith. The shaft member 42 rotatably supports the rotor assembly 28 within the housing 12, shown in FIG. 1. As such, the gear member 40 and rotor assembly 28 rotate unitarily. The gear member 40 is provided in meshing engagement with another gear member, not shown, and together operates to maintain rotational timing between rotor assemblies 28 within the supercharger assembly 10. The gear member 40 has an axis of rotation 44. The tube member 36 is generally aligned with the axis of rotation 44 of the gear member 40. The tube member 36 includes an end portion 46 positioned substantially adjacent to the gear member 40. In a preferred embodiment, the shaft member 42 defines a recess 48 within which the end portion 46 of the tube member 36 is at least partially received.

The cover member 32 partially defines a volume 50 within which a predetermined amount of lubricating oil 52 is contained. With the gear member 40 at rest, or not rotating, the lubricating oil 52 has a fill level, indicated by the phantom line 54. The end portion 46 of the tube member 36 is positioned above the fill level 54 so as to prevent the leakage of lubricating oil 52 via the tube member 36.

During operation of the supercharger assembly 10, heating of the lubricating oil 52 occurs as a function of supercharger load and duration of operation. This temperature rise will tend to increase the pressure within the volume 50 which, if left unregulated, may damage seals, not shown, within the gear drive assembly 20. The tube member 36 operates to vent pressure within the volume 50 to the atmosphere 38 thereby maintaining acceptable pressure limits within the volume 50. As the gear member 40 rotates in the direction as indicated by arrow 55, any lubricating oil 52 thereon will be forced radially outward, away from the axis of rotation 44 of the gear member 40, thereby preventing the lubricating oil from traversing the tube member 36.

Figure 3:
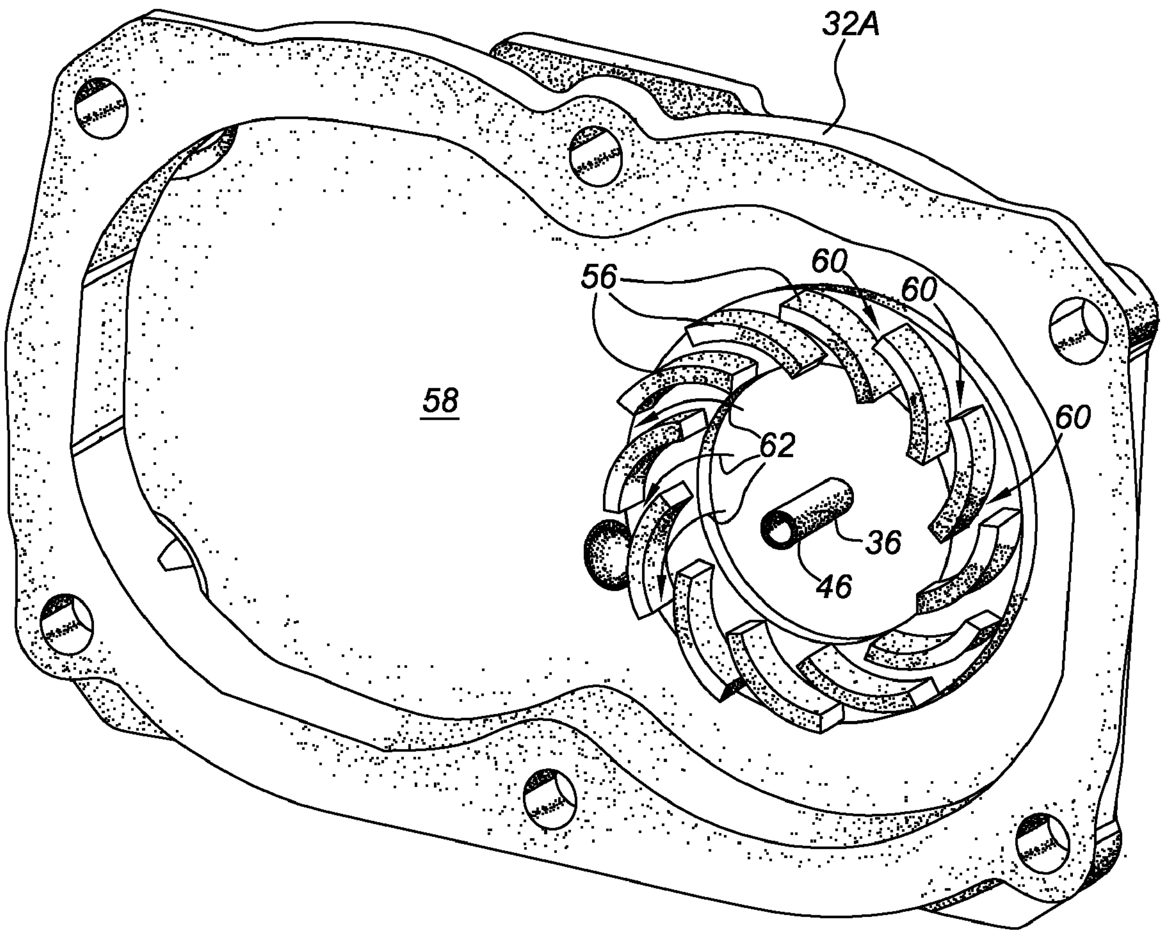
FIG. 3 is a perspective view of a cover member for use with the gear drive assembly of FIG. 2.

Referring to FIG. 3 and with continued reference to FIG. 2, there is shown an alternate embodiment of the cover member 32, generally indicated at 32A. The cover member 32A includes a plurality of projections 56, which extend axially from an inner wall 58 of the cover member 32A toward the gear member 40 of FIG. 2. The projections 56 cooperate to form a plurality of radially outwardly extending channels 60 operable to channel or direct lubricating oil 52 from the axis of rotation 44 of the gear member 40, as indicated by arrows 62. The projections 56 are preferably curved in the direction of rotation of the gear member 40 such that the channels 60 are generally curved in the direction of rotation of the gear member 40, as shown in FIG. 3.

Figure 4:
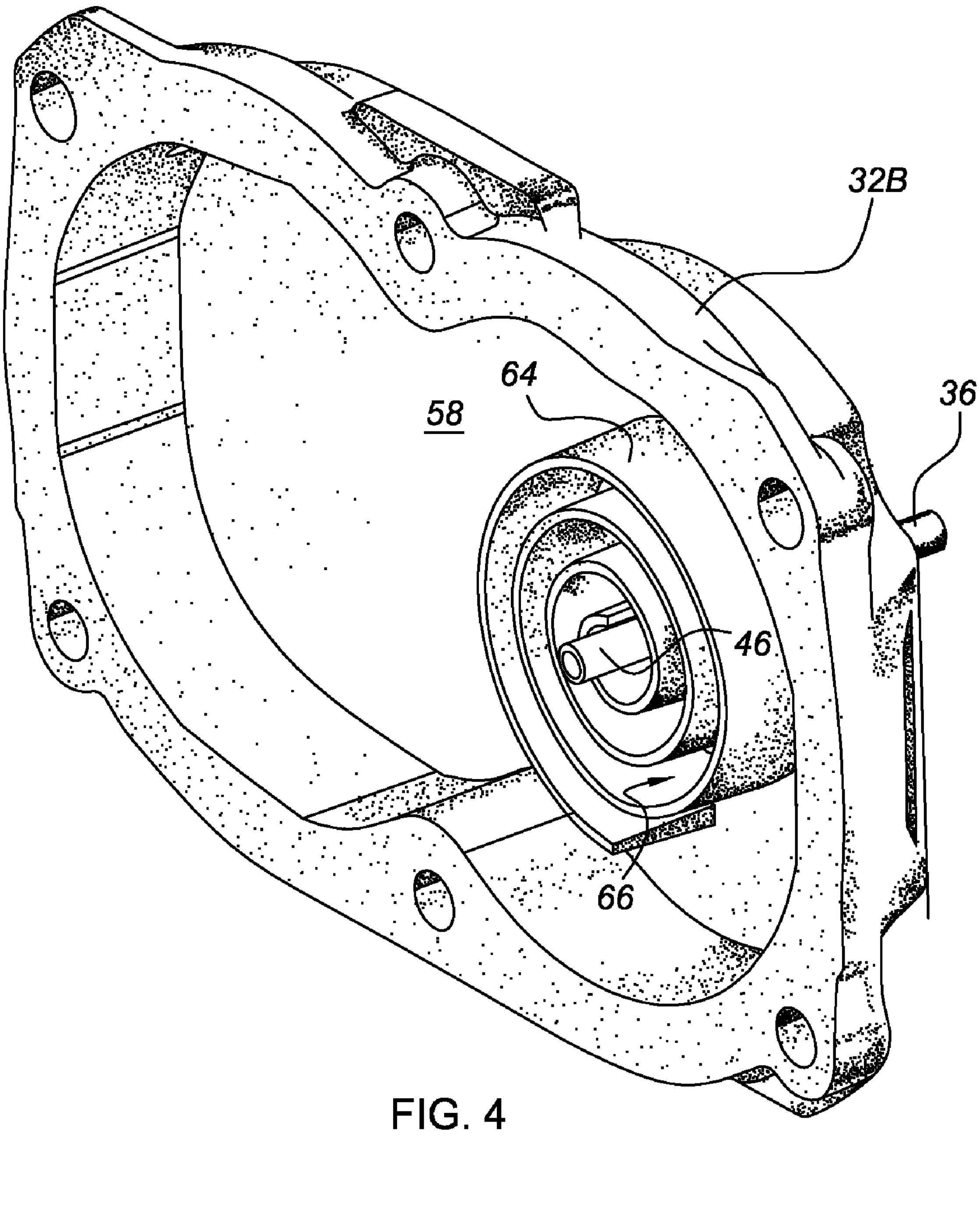
FIG. 4 is a perspective view of an alternate embodiment of a cover member for use with the gear drive assembly of FIG. 2.

Referring to FIG. 4 and with continued reference to FIG. 2, there is shown an alternate embodiment of the cover members 32 of FIGS. 2 and 32A of FIG. 3, generally indicated at 32B. The cover member 32B includes a projecting wall 64, which extends axially from the inner wall 58 of the cover member 32B toward the gear member 40 of FIG. 2. The projecting wall 64 defines a generally outwardly spiraling channel 66 in the direction of rotation of the gear member 40. The channel 66 is operable to substantially prevent the lubricating oil 52 from traversing the axis of rotation 44 of the gear member 40.

By venting the gear drive assembly 20 via the tube member 36, the increase in temperature and pressure within the volume 50 under sustained high load operation of the supercharger assembly 10 may be reduced. The positioning of the tube member 36 is effective in preventing or substantially limiting the loss of lubricating oil 52 through the tube member 36.

While the best modes for carrying out the invention have been described in detail, those familiar with the art to which this invention relates will recognize various alternative designs and embodiments for practicing the invention within the scope of the appended claims.

The invention claimed is:

1. A gear drive assembly for a supercharger having at least one gear member rotatable about an axis of rotation, the gear drive assembly comprising:

- a cover member operable to substantially enclose the at least one gear member;
- a tube member extending though said cover member and generally aligned along the axis of rotation;
- wherein said tube member is operable to vent the gear drive assembly; and
- wherein said cover member at least partially defines a volume within which lubricating oil is disposed and wherein said cover member defines a plurality of radially outwardly extending channels positioned adjacent to the at least one gear member and operable to direct said lubricating oil away from the axis of rotation of the at least one gear member.

2. The gear drive assembly of claim 1, wherein one end of said tube member is positioned substantially adjacent to the at least one gear member.

3. The gear drive assembly of claim 1, wherein said tube member is positioned above said lubricating oil when the at least one gear member is not rotating.

4. The gear drive assembly of claim 1, wherein said plurality of radially outwardly extending channels are curved in the direction of rotation of the at least one gear member.

5. The gear drive assembly of claim 1, wherein the at least one gear member defines a recess and wherein said tube member extends at least partially into said recess.

6. The gear drive assembly of claim 1, wherein said tube member is retained within said cover member through interference fit.

7. A supercharger assembly comprising:

- a housing;
- a gear drive assembly mounted with respect to said housing having:
  - at least one gear member rotatable about an axis of rotation;
  - a cover member operable to substantially enclose said at least one gear member;
  - a tube member extending though said cover member and generally aligned along said axis of rotation;
- wherein said tube member is operable to vent said gear drive assembly; and
- wherein said cover member at least partially defines a volume within which lubricating oil is disposed and wherein said cover member defines a plurality of radially outwardly extending channels positioned adjacent to said at least one gear member and operable to direct said lubricating oil away from said axis of rotation of said at least one gear member.

8. The supercharger assembly of claim 7, further comprising:

- a supercharger drive assembly mounted with respect to said housing;
- wherein said housing includes a first end and an opposed second end; and
- wherein said supercharger drive assembly is positioned adjacent to said first end and said gear drive assembly is positioned adjacent to said second end.

9. The supercharger assembly of claim 7, wherein one end of said tube member is positioned substantially adjacent to said at least one gear member.

10. The supercharger assembly of claim 7, wherein said tube member is positioned above said lubricating oil when said at least one gear member is not rotating.

11. The supercharger assembly of claim 2, wherein said plurality of radially outwardly extending channels are curved in the direction of rotation of the at least one gear member.

12. The supercharger assembly of claim 7, wherein said at least one gear member defines a recess and wherein said tube member extends at least partially into said recess.

13. A supercharger assembly for an internal combustion engine comprising:

- a housing having a first end and an opposing second end;
- a supercharger drive assembly mounted with respect to said first end of said housing;
- a gear drive assembly mounted with respect to said second end of said housing, said gear drive assembly having:
  - at least one gear member rotatable about an axis of rotation;
  - a cover member operable to substantially enclose said at least one gear member;
  - a tube member extending though said cover member positioned substantially adjacent to said at least one gear member and generally aligned along said axis of rotation;

wherein said cover member at least partially defines a volume within which a predetermined amount of lubricating oil is disposed and wherein said tube member is positioned above said predetermined amount of lubricating oil when said at least one gear member is not rotating;

wherein said tube member is operable to vent said gear drive assembly; and wherein said cover member defines a radially outwardly spiraling channel positioned adjacent to said at least one gear member and operable to substantially prevent said lubricating oil from traversing said axis of rotation of said at least one gear member.

* * * * *